United States Patent [19]
Tippett et al.

[11] Patent Number: 5,466,531
[45] Date of Patent: Nov. 14, 1995

[54] POLYTETRAFLUOROETHYLENE LAMINATE AND METHOD OF PRODUCING SAME

[75] Inventors: Stephen W. Tippett, Bedford; Robert C. Ribbans, Amherst, both of N.H.

[73] Assignee: Textiles Coated International, Amherst, N.H.

[21] Appl. No.: 283,095

[22] Filed: Aug. 3, 1994

Related U.S. Application Data

[63] Continuation-in-part of Ser. No. 104,731, Aug. 10, 1993, abandoned.

[51] Int. Cl.[6] .......................... B32B 31/00; B32B 27/00; B29C 65/00
[52] U.S. Cl. .................. 428/422; 156/228; 156/272.2; 156/286; 264/291; 264/297.4; 428/105; 428/421; 428/910
[58] Field of Search .................. 428/421, 422, 428/910, 105, 112; 156/244.11, 272.2, 273.7, 228, 286; 264/297.4, 291

[56] References Cited

U.S. PATENT DOCUMENTS

| | | | |
|---|---|---|---|
| 3,693,851 | 9/1972 | Yazawa | 225/3 |
| 3,714,687 | 2/1973 | van Tilburg | 28/1 |
| 3,770,711 | 11/1973 | Hartig et al. | 428/35.1 |
| 3,876,447 | 4/1975 | Lally | 228/122.1 |
| 4,025,679 | 5/1977 | Denny | 428/91 |
| 4,064,214 | 12/1977 | FitzGerald | 264/147 |
| 4,066,731 | 1/1978 | Hungerford | 264/216 |
| 4,302,495 | 11/1981 | Marra | 428/110 |
| 4,342,812 | 8/1982 | Selwood | 428/286 |
| 4,443,511 | 4/1984 | Worden et al. | 428/198 |
| 4,454,249 | 6/1984 | Suzuki et al. | 521/54 |
| 4,547,424 | 10/1985 | Suzuki | 428/316.6 |
| 4,576,861 | 3/1986 | Kato | 428/316.6 |
| 4,680,215 | 7/1987 | Mercer | 428/107 |
| 4,735,144 | 4/1988 | Jenkins | 101/464 |
| 4,820,787 | 4/1989 | Kataoka et al. | 526/255 |
| 4,865,908 | 9/1989 | Liu et al. | 428/248 |
| 4,932,078 | 6/1990 | Jones et al. | 2/70 |
| 4,935,181 | 6/1990 | Theophilou et al. | 264/104 |
| 4,996,098 | 2/1991 | Perusich et al. | 428/229 |
| 5,006,292 | 4/1991 | Shii et al. | 264/127 |
| 5,017,424 | 5/1991 | Farnworth et al. | 428/230 |
| 5,141,800 | 8/1992 | Effenberger et al. | 428/267 |
| 5,321,109 | 6/1994 | Bosse et al. | 526/255 |

FOREIGN PATENT DOCUMENTS

| | | |
|---|---|---|
| 725704 | 1/1966 | Canada. |
| 764942 | 8/1967 | Canada. |
| 1396131 | 6/1975 | United Kingdom. |
| WO94/04334 | 3/1994 | WIPO. |

OTHER PUBLICATIONS

Database WPI, Derwent Publications Ltd., London, G.B. AN 78–92267A & JP 531331446, Nov. 16, 1978, *Hitachi Maxell*, abstract.

Patent Abstracts of Japan, vol. 3, No. 118, Oct. 4, 1979, JP 54097686 *Sumitomo Electric Ind. Ltd.* Aug. 1, 1979, abstract.

Database WPI, Derwent Publications Ltd., London, G.B., AN 78–62710 & JP 53085865, *Tokyo Tokoshu Elec. Wire*, Jul. 28, 1978, abstract.

Database WPI, Derwent Publications Ltd., London, G.B. An 82–36216 & JP 57051450, *Junko—sha K.K.*, Mar. 26, 1982, abstract.

Primary Examiner—Paul J. Thibodeau
Assistant Examiner—Stephen Sand
Attorney, Agent, or Firm—Samuels, Gauthier & Stevens

[57] ABSTRACT

A flexible fluoroplastic laminate comprising a plurality of unsintered oriented PTFE films laminated under conditions of elevated temperature and pressure. At least one of the films has its direction of orientation disposed angularly with respect to that of at least one other of the films. The films retain their orientation following lamination.

16 Claims, 2 Drawing Sheets

5,466,531

POLYTETRAFLUOROETHYLENE LAMINATE AND METHOD OF PRODUCING SAME

This is a continuation-in-part of application Ser. No. 08/104,731 filed on Aug. 10, 1993, now abandoned.

BACKGROUND OF THE INVENTION

This invention relates to composites, e.g., coated products, laminates and/or combinations thereof, of the type incorporating fluoroplastics as barrier components. Typical applications for such composites include high temperature expansion joints in power plants and chemical processing installations, chemical tank covers, bladders and liners, high temperature insulation jacketing, protective clothing, etc.

In the past, suitable fluoroplastic materials for such composites have included polytetrafluoroethylene ("PTFE"), fluorinated ethylene propylene ("FEP"), and perfluoralkoxy ("PFA"). Although these materials exhibit excellent chemical resistance and barrier properties, they lack toughness (as herein employed, the term "toughness" means the ability of a material to resist multi-directional tearing). In prior applications, therefore, it has been deemed necessary by those skilled in the art to combine these materials with reinforcing substrates. Typically, the reinforcing substrates comprise non-fluoroplastics such as woven fiberglass to which the fluoroplastics are applied as coatings and/or as film laminates.

Although the non-fluoroplastic substrates supply the requisite toughness to the resulting composites, they do so with attendant drawbacks which have heretofore been recognized but considered unavoidable. For example, the non-fluoroplastic substrates contribute undesirable stiffness, bulk and weight to the composites. Non-fluoroplastics also resist stretching, which is desirable in many applications. Of greater concern, however, is the vulnerability of the non-fluoroplastic substrates to chemical attack and degradation. Theoretically, the substrates should be safeguarded from chemical attack by the fluoroplastic components of the composites. As a practical matter, however, chemical protection of the substrates is frequently compromised, typically as a result of the fluoroplastic components being inadvertently damaged through mishandling or unavoidably ruptured by fasteners such as screws, rivets, staples or the like when the composites are fabricated into various structures. Once the barrier properties of the fluoroplastic components are compromised, the non-fluoroplastic substrates are exposed to chemical attack and the composites are doomed to failure.

All-fluoroplastic composites including fabrics woven from fluoroplastic fibers combined with fluoroplastic coatings and/or films also have been developed. However, such composites have relatively low tensile and tear strengths, are relatively expensive to produce, and thus are appropriate for only a limited range of applications.

Accordingly, an objective of this invention is to provide a novel and improved PTFE laminate having high tensile and tear strengths, flexibility, and excellent chemical resistance and barrier properties.

A companion objective of the present invention is the provision of a relatively light weight PTFE laminate suitable for applications requiring toughness, chemical resistance and flexibility.

Still another objective of the present invention is the provision of a novel and cost effective method of producing the laminates of the present invention.

SUMMARY OF THE INVENTION

In accordance with the present invention, a laminate is constructed of oriented PTFE films. Preferably, the PTFE films are unsintered prior to lamination, and are uniaxially oriented, typically as a result of their having been extruded or calendered during production. The films are sintered during lamination, but retain their orientation. The directions of orientation of at least some of the PTFE films as laminated are purposely non-parallel, and selected to achieve multi-directional tear resistance. The resulting toughness of the laminate is achieved without including non-fluoroplastic substrates, thus obviating or at the very least substantially minimizing many of the attendant drawbacks associated with prior art composites.

DETAILED DESCRIPTION OF THE INVENTION

Figure 1:
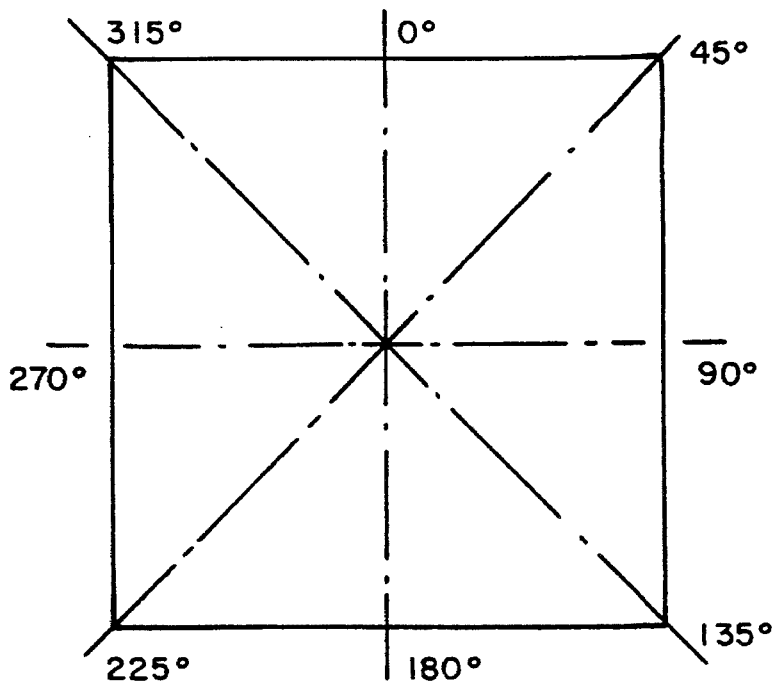
FIG. 1 is a diagrammatic illustration of the directional layout used to describe the relative positioning of oriented films in the various examples of the invention to be hereinafter discussed in greater detail.

In the following discussion, the relative positions of the uniaxially oriented films with respect to one another are given with reference to the directional layout depicted schematically in FIG. 1. Tensile strengths, thickness and weights are measured in accordance with ASTM D751-79. Tear strengths are measured by the conventional trapezoidal tear test where, for example, tear strength in the 0°°–180° direction is measured by slitting the laminate in the 90°–270° direction and then measuring the force required to pull the slit apart in the 0°–180° direction.

Figure 2:
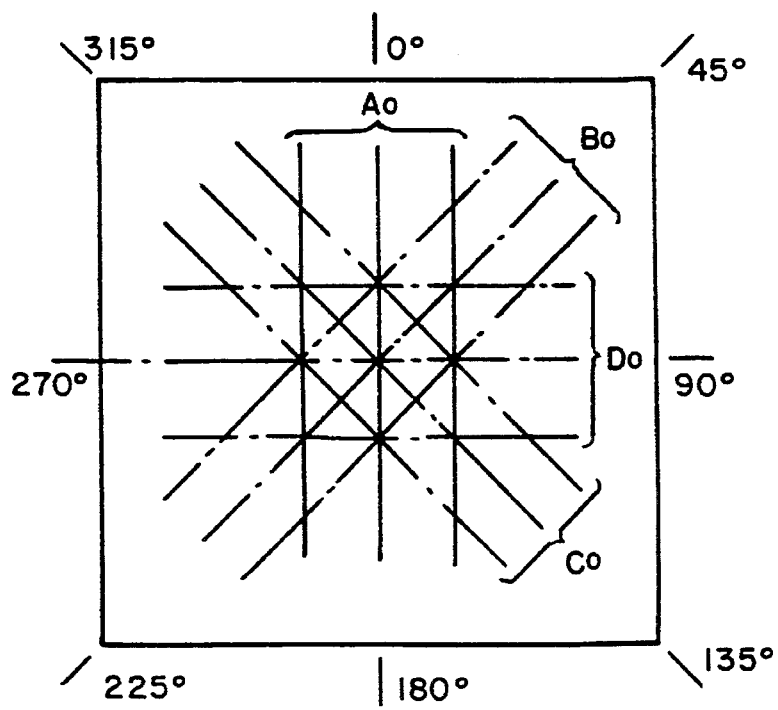
FIG. 2 is a diagrammatic illustration of the relative positioning of the oriented films in Example 1.
Figure 3:
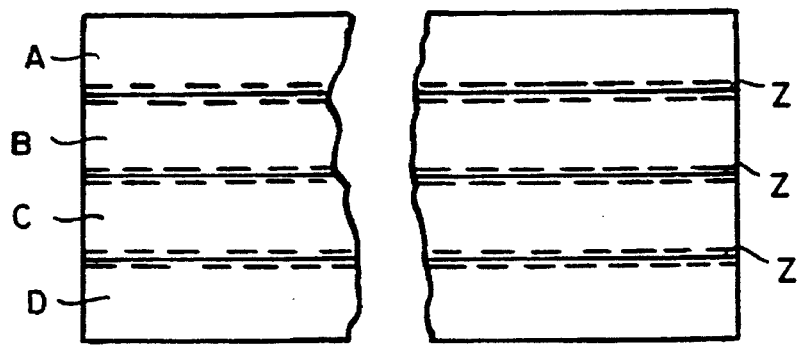
FIG. 3 is a cross sectional schematic illustration of a typical laminate in accordance with the present invention.

With reference to FIGS. 2 and 3, a typical laminate in accordance with the present invention will include a plurality of axially oriented PTFE films A,B,C,D laminated directly together, i.e., without the interposition of an adhesive or bonding agent therebetween. The PTFE films are preferably unsintered prior to lamination, and preferably are uniaxially oriented, with at least one of the films having its direction of orientation disposed angularly with respect to that of at least one other of the films. A typical layout of film orientations is depicted in FIG. 2. PTFE film thicknesses will typically range between 1–10 mils, and preferably from 2–5 mils.

Lamination is effected between heated platens under conditions of elevated pressure and temperature for varying time intervals. Lamination pressures need only be sufficient to expel entrapped air from between the plies while promoting intimate face-to-face contact. Pressures at or above 1 p.s.i. have been deemed adequate, with the preferred pressure range being between about 40–60 p.s.i.

Lamination temperatures (measured as the temperatures of the platens in contact with the laminate) are selected to accommodate numerous variables, including differing laminator designs and thermal capabilities, the type of PTFE film being processed, e.g., sintered or unsintered, the number and thickness of the films making up the laminate, the residence time of the films in the laminator, etc.

In all cases, however, the entire cross section of the laminate is heated above the melt temperature of the constituent films, which for unsintered PTFE is about 650° F., and for sintered PTFE is somewhat lower at about 621° F. This results in the formation of interphase zones "z" at the bond lines where the molecules of adjacent films have commingled. Lamination temperatures are kept below about 900° F. to avoid degrading or thermally disturbing the surface films of the laminate. Typically, lamination temperatures will range from about 660°–760° F., preferably between 710°–730° F.

Lamination times are selected to achieve uniform cross sectional heating of the laminate, and are otherwise minimized in order to promote production efficiencies. Typical lamination times range between 20–70 seconds, depending on the other process and equipment variables described above.

The invention and its advantages are further illustrated by the following examples wherein laminates comprising various combinations of unsintered PTFE films are laminated and sintered. The uniaxially oriented PTFE films were obtained either from Garloc Plastomers of Newtown, Pa. or from Dewal Industries of Saunderstown, R.I. The non-oriented (skived) PTFE films were obtained from Dewal Industries.

In the following Examples 1–5, lamination was effected at 720° F. and 40 p.s.i. for a period of 70 seconds. The films were sintered during lamination, and retained their respective directions of orientation following lamination.

EXAMPLE 1

A laminate was produced by laminating four uniaxially oriented unsintered 2 mil PTFE films A,B,C, and D together in that order. The oriented films were positioned in directions $A_o, B_o, C_o$ and $D_o$ respectively as follows:

$A_o$: 0°–180°

$B_o$: 45°–225°

$C_o$: 135°–315°

$D_o$: 90°–270°

The resulting laminate exhibited improved tensile and tear strengths as shown in Table 1.

EXAMPLE 2

A laminate similar to that of Example 1 was produced, except that the oriented films were each 3 mil uniaxially oriented unsintered PTFE films. The characteristics of the resulting laminate are provided in Table 1.

EXAMPLE 3

A laminate was produced by combining eight uniaxially oriented unsintered 3 mil PTFE films A–H together in that order. The oriented films were positioned in directions $A_o$–$H_o$ respectively as follows:

$A_o$ and $E_o$: 0°–180°

$B_o$ and $F_o$: 45°–225°

$C_o$ and $G_o$: 135°–315°

$D_o$ and $H_o$: 90°–270°

The characteristics of the resulting laminate are provided in Table 1.

EXAMPLE 4

A laminate was produced by combining sixteen uniaxially oriented unsintered 3 mil PTFE films A–P together in that order. The films were positioned in directions $A_o$–$P_o$ respectively as follows:

$A_o, E_o, I_o$ and $M_o$: 0°–180°

$B_o, F_o, J_o$ and $N_o$: 45°–225°

$C_o, G_o, K_o$ and $O_o$: 135°–315°

$D_o, H_o, L_o$ and $P_o$: 90°–270°

The characteristics of the resulting laminate are provided in Table 1.

EXAMPLE 5

A laminate was produced by combining twelve uniaxially oriented unsintered 8 mil PTFE films A–L together in that order. The films were positioned in directions $A_o$–$P_o$ respectively as follows:

$A_o, E_o,$ and $I_o$: 0°–180°

$B_o, F_o,$ and $J_o$: 45°–225°

$C_o, G_o,$ and $K_o$: 135°–315°

$D_o, H_o,$ and $L_o$: 90°–270°

The characteristics of the resulting laminate are provided in Table 1.

TABLE 1

| Oriented PTFE Laminates Of The Invention | Ex. 1 4 plys of 2 mil films | Ex. 2 4 plys of 3 mil films | Ex. 3 8 plys of 3 mil films | Ex. 4 16 plys of 3 mil films | Ex. 5 12 plys of 8 mil films |
|---|---|---|---|---|---|
| Actual thickness (in) | 0.0085–0.014 | 0.012–0.021 | 0.023–0.035 | 0.058 | 0.080 |
| Weight (oz/yd$^2$) | 11.0 | 17.8 | 42.3 | 80.0 | 125.0 |
| Tensile (lb/in) | | | | | |
| 0°–180°: | 29–31 | 49–53 | 135–145 | 260 | 370 |
| 90°–270°: | 28–37 | 54–57 | 130–138 | 320 | 350 |

TABLE 1-continued

| Oriented PTFE Laminates Of The Invention | Ex. 1 4 plys of 2 mil films | Ex. 2 4 plys of 3 mil films | Ex. 3 8 plys of 3 mil films | Ex. 4 16 plys of 3 mil films | Ex. 5 12 plys of 8 mil films |
|---|---|---|---|---|---|
| Tear (lb/in) | | | | | |
| 0°–180°: | 26–30 | 48–58 | 154–163 | >250* | >250* |
| 90°–270°: | 30–37 | 50–86 | 130–150 | >250* | >250* |

*Tear strengths greater than 250 lb/in could not be measured with available test equipment.

EXAMPLE 6

A laminate was produced by combining four uniaxially oriented unsintered 3 mil PTFE films A–D, with their orientations $A_o-P_o$ arranged respectively as follows:

$A_o$: 0°–180°

$B_o$: 45°–225°

$C_o$: 135°–315°

$D_o$: 90°–270°

Lamination was effected at 660° F. and 60 p.s.i. for 45 seconds.

The characteristics of the resulting laminate are provided in Table 2.

EXAMPLE 7

A laminate was produced by combining four uniaxially oriented unsintered 3 mil PTFE films in the arrangement described in Example 6, with lamination being effected at 760° F. and 60 p.s.i. for 20 seconds. The characteristics of the resulting laminate are provided in Table 2.

TABLE 2

| Oriented PTFE Laminates of the Invention | Example 6 | Example 7 |
|---|---|---|
| Thickness (inches) | 0.011 | 0.011 |
| Weight (Oz/yd²) | 15.1 | 15.2 |
| Tensile (lb./in) | | |
| 0°–180° | 52–56 | 53–68 |
| 90°–270° | 56–63 | 54–64 |
| Tear (lb/in) | | |
| 0°–180° | 28–61 | 26–62 |
| 90°–270° | 31–61 | 24–54 |

The interrelationship of physical factors responsible for the improved tear strengths of the laminates of the invention is not fully understood. However, it appears that the superior tear strengths are achieved because the laminates of the invention are able to disperse the point stress of a tear into a larger area. The combination of the high tensile strengths of the films in their directions of orientation, together with the elongation properties of the films in all directions, cooperate to effectively arrest the movement of the tear stress point across the laminate.

It is believed that when a tear is introduced into a laminate of the invention, the stress point of the tear is distributed relatively short distances along the two or more axes of orientation of the films. It is also believed that the films elongate within the small area defined by the distances along the axes of orientation. The elongation of the films may cause a small amount of delamination to occur within the defined area. The maximum tear strengths of laminates having many layers of oriented PTFE may ultimately depend on the tensile strengths of the laminates, since such laminates appear to effectively redirect tear stresses into tensile stresses.

Another benefit of laminates of the invention relates to the ability of the laminates to elongate and therefore yield to their environment due to creep. Creep is the total deformation under stress after a specified time in a given environment beyond that which occurs immediately upon loading. For example, the ability of an expansion joint to yield to internal pressures and thereby increase the radius of an arc formed by the material extending across a space between interconnected components, will decrease the stresses on the material due to the well known hoop stress relationship. Specifically, the stress may be defined as:

$$F=(P \times D)/2 \text{ or } F=P \times R$$

where F is the circumferential stress on the material, P is the pressure within the joint, and R is the radius of the arc formed by the material. It has been found that laminates of the invention experience sufficient creep to safely yield to the demands of the environment, yet do not distort to an extent that would compromise the structural integrity or barrier properties of the laminates.

The laminates of the invention are tear resistant yet capable of elongating responsive to stresses applied to the laminates. This unique combination of features will likely lead to widespread use of laminates of the invention in applications not currently being served by present materials.

For purposes of comparison, data was collected for sintered non-oriented PTFE films. The data is reproduced in Table 3.

TABLE 3

| Non-Oriented Films And Laminates Thereof | thickness (inches) | weight (oz/yd²) | tensile (lb/in) | tear (lb/in) |
|---|---|---|---|---|
| 3 mil PTFE film | 0.003 | 4.75 | 3–4 | 0.5–1.0 |
| 4 mil PTFE film | 0.004 | 6.6 | 8–9 | 4–6 |
| 11 mil PTFE film | 0.011 | 16 | 29.5–33 | 2.3–4.5 |

Data was also collected for single plies of oriented PTFE film as well as laminates of non-angularly disposed films of PTFE. The results are reproduced in Table 4.

TABLE 4

| Oriented Films At 0°–180° And Laminates Of Non-Angularly Disposed Oriented Films At 0°–180° | 2 mil PTFE | 3 mil PTFE | 4 mil PTFE | Laminate 4 mil skived PTFE 3 mil PTFE 3 mil PTFE 4 mil skived PTFE | Laminate 7 plies of 6 mil PTFE |
|---|---|---|---|---|---|
| Actual thickness (in) | 0.002 | 0.003 | 0.004 | 0.017–0.019 | 0.036 |
| Weight (oz/yd²) | 2.4 | 4.0 | 4.9 | 22.7 | 67.5 |
| Tensile (lb/in) | | | | | |
| 0°–180°: | 7.5–8.0 | 16–17 | 15–23 | 60–68 | 260–290 |
| 90°–270°: | 3.0–3.5 | 7.5–8.0 | 5.5 | 29–33 | 60–102 |
| Tear (lb/in) | | | | | |
| 0°–180°: | 5.0–9.0 | 13–14 | 19–22 | 35–43 | 273 |
| 90°–270°: | 3.0–5.0 | 4.0–5.0 | 3.0–4.0 | 21–25 | 15–31 |

The single PTFE films in Table 4 were sintered, whereas the films making up the laminates were unsintered prior to but sintered during lamination. All films were uniaxially oriented with the exception of the skived PTFE films as indicated. From a comparison of the examples of the invention to the films and laminates of Tables 3 and 4, it is evident that the laminates of the invention exhibit improved tensile and tear strengths in all directions.

For thicker laminates involving large numbers of stacked PTFE films, the task of layering the individual films may become unacceptably labor intensive and time consuming. Moreover, prior to final lamination, the stacked films are susceptible to inadvertent shifting, which may result in a disruption of the optimum array of film orientations.

Figure 4A:
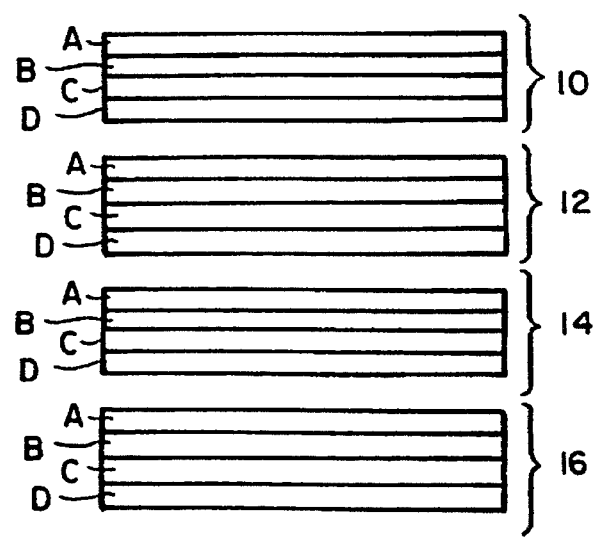
FIGS. 4A and 4B are schematic illustrations depicting the use of sublaminates in the production of laminates according to the present invention.
Figure 4B:
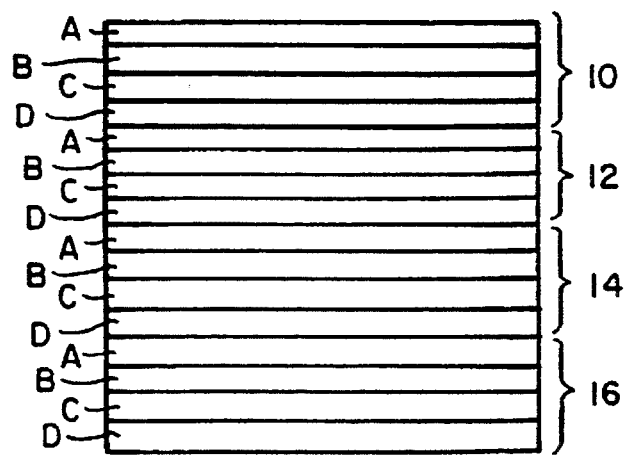

These problems can be substantially minimized by producing sublaminates of unsintered films, which are then stacked one on the other for final sintering and lamination into a finished product. For example, as shown in FIG. 4A, a plurality of sublaminates 10, 12, 14 and 16 can be produced and stored for subsequent use when and as desired. Each sublaminate will typically comprise an appropriate angular array of uniaxially oriented unsintered PTFE films A,B,C,D laminated together for an appropriate residence time under pressure and at temperatures below the melt temperature of the constituent films. Typical sublaminating conditions are temperatures of between about 250° and 350° F., preferably about 300° F., pressures of about 40 p.s.i., and residence times on the order of 20 to 25 seconds. The resulting sublaminates have adequate structural integrity to withstand delamination during subsequent storage and processing, but are otherwise readily delaminated without attendant distortion, stretching or degradation of the individual films. Moreover, the sublaminates are largely free of the internal stresses that accompany sintering, and thus where appropriate, sublaminates can be subdivided into smaller pieces without resulting distortion. As shown in FIG. 4B, on an "as needed" basis, the sublaminates can be quickly and efficiently combined to produce relatively thick finished products having all of the features and advantages of products produced by stacking and laminating individual films.

Typical illustrations of a sublaminate and a laminate produced by a combination of that sublaminate are provided by the following Examples 8 and 9.

EXAMPLE 8

A sublaminate was produced by combining four uniaxially oriented unsintered PTFE films A–D positioned as follows:

$A_o$: 0°–180°

$B_o$: 45°–225°

$C_o$: 135°°–315°

$D_o$: 90°°–270°

Sublamination was effected at 300° F. and 40 p.s.i. for a period of 25 seconds. The resulting sublaminate exhibited the characteristics described above.

EXAMPLE 9

A laminate was produced by combining four of the sublaminates of Example 8. Lamination was effected at 720° F. and 60 p.s.i for a period of 70 seconds. The resulting laminate exhibited the following characteristics:

| Thickness (in): | 0.060 |
|---|---|
| Weight (oz/yd²): | 91.2 |
| Tensile (lb/in) | |
| 0°–180°: | 282–348 |
| 90°–270°: | 275–330 |
| Tear (lb/in) | |
| 0°–180°: | >250 |
| 90°–270°: | >250 |

The laminates of the invention are not only superior to laminates having burdensome fabric substrates, but potential applications of the invention also include countless situations which, until now, have not been appropriate for fluoroplastic laminates. Virtually any application in which the laminate is required to change shape to accommodate its environment without compromising its strength and barrier properties, is a potential application for the tough PTFE laminates of the present invention. Such applications may include, for example, vacuum molded laminates or expansion joint laminates. The ability of expansion joints made from laminates of the invention to forgive lateral, rotational or angular misalignment is of great significance in the design and selection of expansion joints.

It will be appreciated by those skilled in the art that the laminates of the invention may include films of fluoroplastics in addition to the PTFE films, and that the laminates of the invention may be combined with non-fluoroplastic materials. It will also be appreciated that the PTFE films need not be comprised of entirely PTFE, but may include other substances to the extent that the presence of such substances (such as ground fiberglass, metal or fluoroelastomers) do not prohibit the benefits of the invention from being realized.

Those skilled in the art will appreciate that numerous modifications to the above embodiments may be made without departing from the scope of the invention.

We claim:

1. A flexible fluoroplastic chemical barrier laminate having improved toughness, said laminate comprising a plurality of axially oriented unsintered polytetrafluoroethylene films laminated directly together without entrapped air or the interposition of an adhesive therebetween at a temperature above the melt temperature of said films but below 900° F., said films being sintered during lamination and remaining axially oriented following lamination, with at least one of said films having its direction of orientation disposed angularly with respect to that of at least one other of said films adjacent to said one film.

2. The laminate of claim 1 wherein said films are laminated at a pressure of 1 to 60 p.s.i.

3. The laminate of claim 2 wherein said films are laminated for a time period of 20 to 70 seconds.

4. The laminate of claims 1, 2 or 3 wherein said films are laminated at a temperature of 660° to 760° F.

5. The laminate of claim 1 wherein said films are uniaxially oriented and range in thickness from 1 to 10 mils.

6. The laminate of claim 1 wherein the molecules of adjacent films are commingled to form interphase zones at the bond lines between said films.

7. A method of producing a flexible fluoroplastic chemical barrier laminate having improved toughness, said method comprising:

a.) stacking a plurality of axially oriented unsintered polytetrafluoroethylene films without interposing an adhesive therebetween, with at least one of said films having its direction of orientation disposed angularly with respect to that of at least one other of said films adjacent to said one film; and b.) confining the stacked films between heated platens to expel entrapped air from between said films while laminating said films at a temperature above the melt temperature of said films but below 900° F., said films being sintered during lamination and remaining axially oriented following lamination.

8. The method of claim 7 wherein lamination is effected by heating said films to a temperature of between about 660° and 760° F.

9. The method of claim 7 wherein lamination is effected while subjecting said films to a pressure of 1 to 60 p.s.i.

10. The method of claim 7 wherein lamination is effected for a time period of between about 20 to 70 seconds.

11. The method of claim 7 wherein the molecules of adjacent films commingle to create molecular interphase zones at the bond lines between said films.

12. The method of claim 7 wherein prior to lamination, at least some of said films are integrally combined into sublaminates.

13. The method of claim 12 wherein said sublaminates are formed by pressing said films together under conditions of elevated pressure and temperature for a time interval sufficient to effect adhesion at the interface between adjacent films, said adhesion being such that the films of the sublaminate may be readily delaminated without distorting, stretching or degrading said films.

14. The method of claim 13 wherein said sublaminates are formed by subjecting said films to a pressure of about 40 p.s.i.

15. The method of claim 13 wherein said sublaminates are formed by heating said films to a temperature of between about 250° and 300° F.

16. The method of claim 13 wherein said sublaminates are formed by subjecting said films to conditions of elevated pressure and temperature for a time period of about 15 to 25 seconds.

* * * * *